United States Patent
Dolby

[15] 3,652,037
[45] Mar. 28, 1972

[54] AIRCRAFT

[72] Inventor: Geoffrey Dolby, Derby, England

[73] Assignee: Rolls-Royce Limited, Derby, England

[22] Filed: Nov. 10, 1970

[21] Appl. No.: 88,347

[30] Foreign Application Priority Data

Nov. 28, 1969 Great Britain.................58,394/69

[52] U.S. Cl. .............................244/56, 74/89.15, 244/12 A
[51] Int. Cl. .....................................................B64d 27/00
[58] Field of Search...................244/12 A, 56; 74/89.15, 89; 60/228

[56] References Cited

UNITED STATES PATENTS

| | | | |
|---|---|---|---|
| 3,289,980 | 12/1966 | Hill | 244/56 |
| 3,424,016 | 1/1969 | McMillen | 74/89.15 |
| 3,575,378 | 6/1969 | Fawkes | 74/89.15 |

*Primary Examiner*—Richard E. Aegerter
*Attorney*—Cushman, Darby & Cushman

[57] ABSTRACT

This invention concerns aircraft including a gas turbine engine mounted for pivotal movement with respect to aircraft fixed structure, a fuel control unit for said engine having a rotary portion rotation of which adjusts the fuel supply to said engine, a control mechanism for rotating said rotary member, said mechanism being spaced from the pivot axis of the said engine, the said mechanism comprising a manually adjustable member, a first member mounted within said fixed structure and displaceable in response to actuation of said manually adjustable member, a coupling device which is connected between said first member and said rotary member and which converts a relatively small linear movement into a relatively large rotational movement, and a second member secured to said device for interengagement with said first member, the first member when the said manually adjustable member is actuated, driving the second member and thus the said device to effect a relatively small linear movement and thus a relatively large rotational movement of said rotary member, pivotal movement of said engine being unaccompanied by any transmission of drive between the first and second members.

4 Claims, 4 Drawing Figures

PATENTED MAR 28 1972
3,652,037
SHEET 1 OF 2
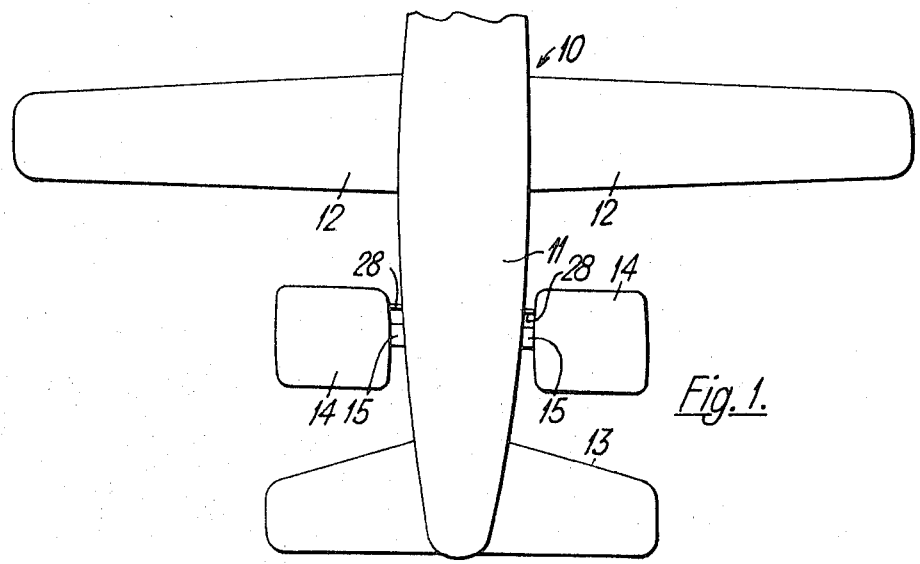
Fig.1.
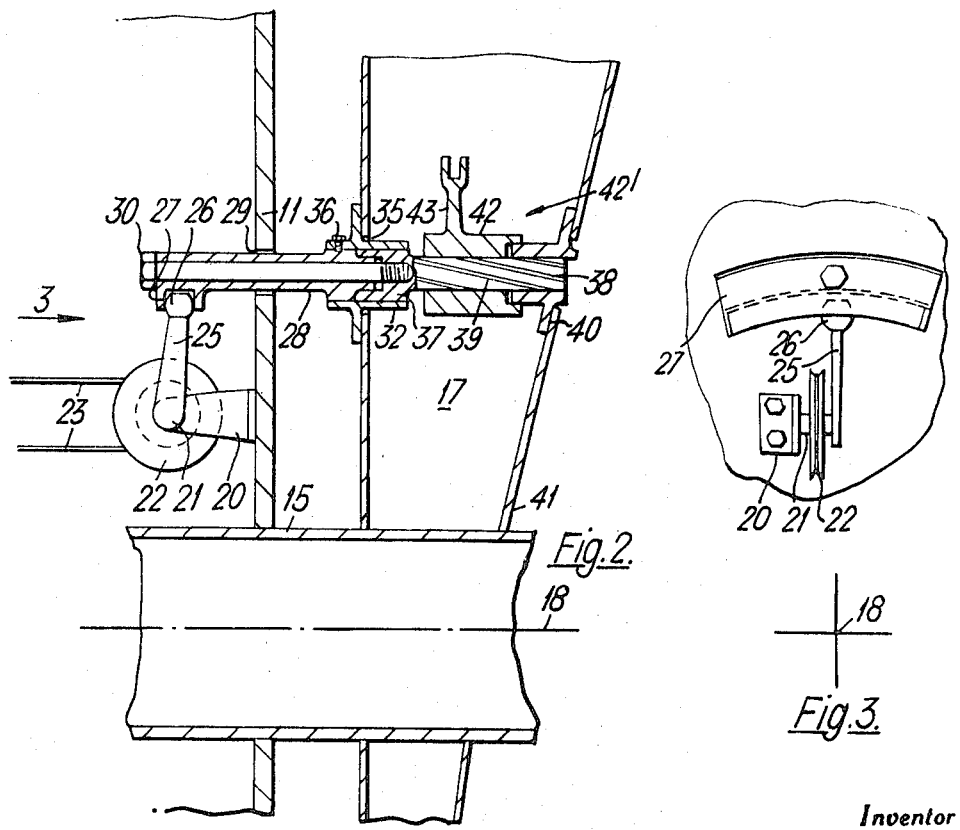
Fig.2.
Fig.3.
Inventor
GEOFFREY DOLBY
By
Cushman, Darby & Cushman Attorney

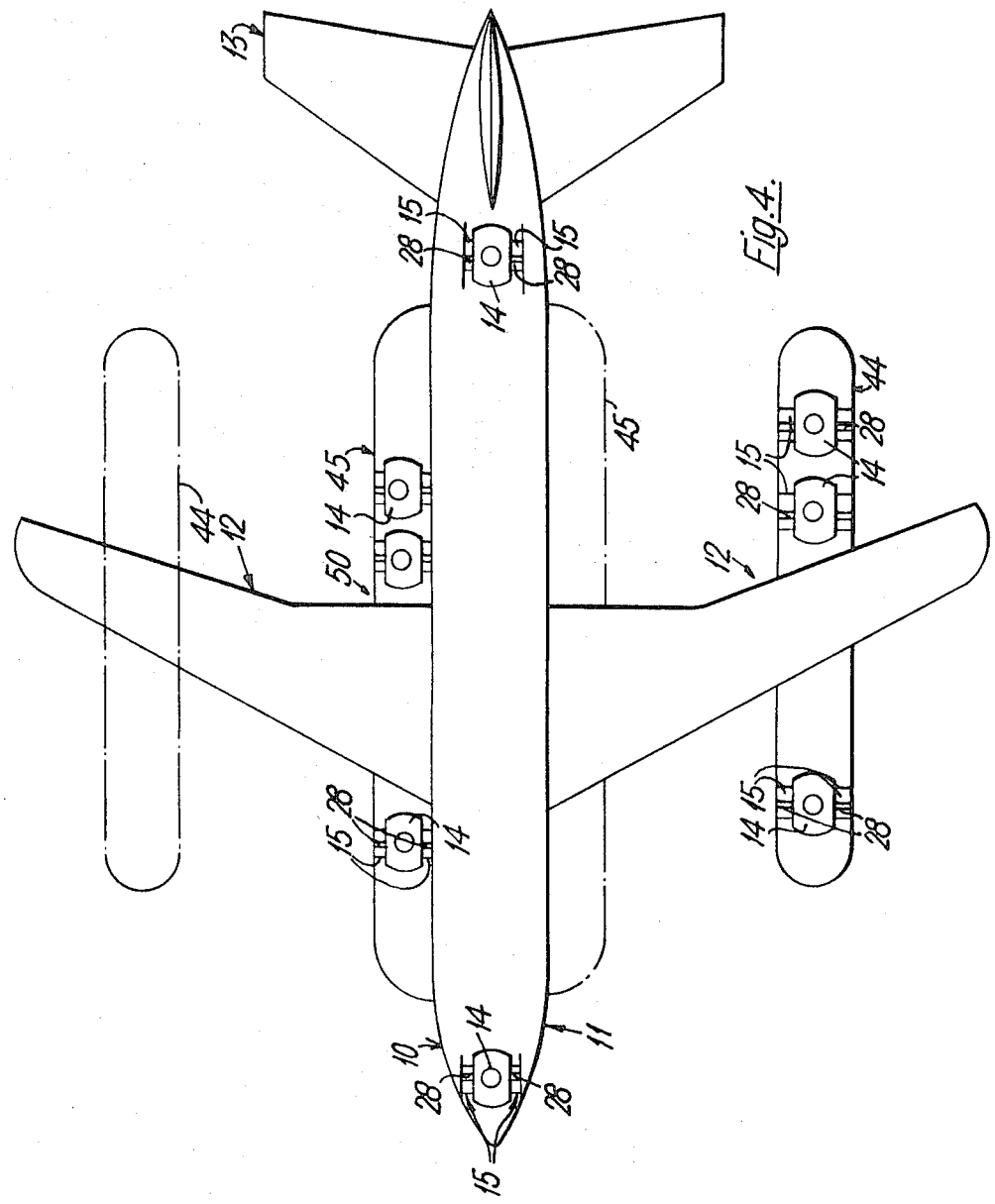

AIRCRAFT

This invention concerns improvements relating to aircraft and more particularly aircraft propelled by jet propulsion gas turbine engines which are mounted on aircraft fixed structure so as to be rotatable between a position in which the engines provide forward propulsion only and a position in which the thrust of the engines has at least a component in a vertical direction to provide lift.

Conventionally, such pivotally mounted engines are mounted on suitable trunnions extending from, or situated within the fuselage, or disposed in a wing-supported pod, and situations may arise in which it is undesirable or impracticable to utilize the inside of a trunnion for providing a connection between a pilot's control and the fuel control unit of the pivotally mounted engine. The present invention seeks to provide a solution to this problem.

According to the present invention, there is provided aircraft including a gas turbine engine mounted for pivotal movement with respect to aircraft fixed structure, a fuel control unit for said engine having a rotary portion rotation of which adjusts the fuel supply to said engine, a control mechanism for rotating said rotary member, said mechanism being spaced from the pivot axis of the said engine, the said mechanism comprising a manually adjustable member, a first member mounted within said fixed structure and displaceable in response to actuation of said manually adjustable member, a coupling device which is connected between said first member and said rotary member and which converts a relatively small linear movement into a relatively large rotational movement, and a second member secured to said device for interengagement with said first member, the first member when the said manually adjustable member is actuated, driving the second member and thus the said device to effect a relatively small linear movement and thus a relatively large rotational movement of said rotary member, pivotal movement of said engine being unaccompanied by any transmission of drive between the first and second members.

Preferably said first member is a lever having a part-spherical end engaged in an arcuate channel member which constitutes the second member and which is rotatable about the axis of pivotal movement of said engine, the pivotal axis of said lever being at an angle to the first-mentioned axis.

The said device may include a spindle to which said channel member is secured, a drive shaft carrying the said rotary member and engaged with said spindle for rotation therewith, the said drive shaft being provided with multi-start threads.

Optionally, a ball screw and nut mechanism connects the drive shaft and the rotary member.

The invention will now be described, merely by way of example, with reference to the accompanying drawings, in which:

FIG. 1 is a somewhat diagrammatic plan view of an aircraft in accordance with the present invention, FIG. 2 is a sectional view on an enlarged scale of a fuel control mechanism for connecting a pilot's fuel control to the fuel control unit of the pivotally mounted engines shown in FIG. 1, FIG. 3 is a fragmentary elevational view taken along the arrow 3 in FIG. 2, and FIG. 4 is a view generally similar to FIG. 1 but showing alternative locations for the pivotable engines of the aircraft.

Referring first to FIGS. 1 to 3 of the drawings, there is shown an aircraft 10 having a fuselage 11 to which are secured fixed wings 12 and a tail unit 13. Axially between the wings 12 and the tail unit 13 the fuselage 11 carries a pair of gas turbine jet propulsion engines 14, one on either side of the longitudinal axis of the aircraft, each engine 14 being pivotally mounted on trunnions 15. Means (not shown) are provided for effecting rotation of the engines 14 from a position shown in FIG. 1 in which they provide forward propulsion only and a so-called vectored position in which the engines 14 provide vertical thrust only or vertical thrust in combination with some forward propulsion as well, depending on the angle of rotation.

Clearly if the interior of the trunnions 15 cannot be utilized to provide a connection between a pilot's control (not shown) located in the fuselage 11 and a fuel control unit 42' within the engine 14, a separate connection must be provided which will be able to maintain fuel flow control in all positions of the engine 14.

Referring now more specifically to FIGS. 2 and 3, the trunnion 15 is shown as extending between respective aligned apertures in the fuselage 11 and in a pod 17 for the engine 14. The rotational axis of the trunnion 15 and thus the engine 14 is shown in chain-dotted lines at 18.

A bracket 20 is secured to the interior of the fuselage 11 and this bracket has a short shaft 21 rotatably mounted therein. On the shaft 21 is a pulley 22 which has a V-shaped profile and has a cable 23 entrained around it. The cable 23 is manually adjustable and is connected to the controls of the engine 14 at the pilot's flight deck (not shown). One end of a rocking lever 25 is pivotally secured to the shaft 21 and its other end is formed with a part-spherical head 26. The head 26 is received in a part-circular, channel-shaped member 27 which is integral with a spindle 28 extending through an arcuate aperture 29 in the fuselage 11.

The spindle 28 is hollow and its interior is threaded to receive an elongated bolt 30. The end of the spindle 28 remote from the channel member 27 is axially slidably journaled in plain bearings 32 secured to, and extending through a suitable aperture 35 in, the pod 17. In the region where the spindle 28 is mounted in the plain bearings 32, the spindle is provided with a single spline in which is located a grub screw 36 to prevent the spindle 28 from rotating about its own axis. The end of the spindle 28 remote from the head of the bolt 30 is formed with a reduced diameter which is surrounded in closely fitting relationship by an enlarged end 37 of a drive shaft 38. The enlarged end 37 is also journaled in the plain bearings 32 and is internally tapped to receive the bolt 30 for threaded engagement therewith. The drive shaft 38 is also journaled in plain bearings 40 at the internal wall 41 of the pod 17. The shaft 38 carries a helical spline groove (not shown) on its periphery in which is located a ball screw and nut mechanism (not shown), connecting the shaft 38 to the boss portion 42 of a forked fuel control lever 43 forming part of the fuel control unit 42' of the engine 14. As can be seen, the shaft 38 is provided with multi-start threads 39 and in a preferred embodiment it has a three-start threading with a helix angle of approximately 68°.

As can be seen from the drawing, the pivotal axis of the rocking lever 25 is at an angle to the rotational axis 18 of the engine 14. As a result, when a movement of the pilot's throttle control is transmitted via the cables 23 and the pulley 22 to the rocking lever 25, the latter will exert a force on the side walls of the channel member 27 to cause the spindle 28 to effect a linear movement which is transmitted to the shaft 38. Owing to the multi-start threads on the shaft 38, a small linear movement thereof is converted into a relatively large rotational movement of the fuel control lever 43. In a typical practical embodiment, a movement of 0.75 inches of the shaft 38 causes a 90° angular movement of the fuel control lever 43.

On the other hand, when the engine 14 is moved pivotally, the channel member 27 is merely angularly displaced about the axis 18 to move relatively to the part-spherical head 26 without moving the latter. Naturally the shape and arcuate length of the aperture 29 in the fuselage 11 is such as to allow the full intended pivotal movement of the engine.

In FIG. 4, there is shown an aircraft 50 which is generally similar to the aircraft 10, but which illustrates alternative locations for pivotable engines 14. It will, of course, be understood that usually not all of the possible engine locations shown in FIG. 4 would be utilized, but the invention is applicable to any one or more of the illustrated locations.

More specifically, the wings 12 may support respective engine pods 44, one of which is shown in broken outline only. Each pod 44 has a plurality of "vectorable" engines 14 therein, each engine being rotatable about respective trunnions 15 and provided with mechanisms as shown in FIGS. 2 and 3, only the respective spindles 28 being shown. Alternatively, a number of such engines 14 may be disposed in pods 45 attached to the fuselage 11 along the length thereof, or they may be mounted within the actual fuselage 11 itself, in the nose and/or adjacent the tail of the aircraft.

I CLAIM:

1. Aircraft including a gas turbine engine mounted for pivotal movement with respect to aircraft fixed structure, a fuel control unit for said engine having a rotary portion rotation of which adjusts the fuel supply to said engine, a control mechanism for rotating said rotary member, said mechanism being spaced from the pivot axis of the said engine, the said mechanism comprising a manually adjustable member, a first member mounted within said fixed structure and displaceable in response to actuation of said manually adjustable member, a coupling device which is connected between said first member and said rotary member and which converts a relatively small linear movement into a relatively large rotational movement, and a second member secured to said device for interengagement with said first member, the first member when the said manually adjustable member is actuated, driving the second member and thus the said device to effect a relatively small linear movement and thus a relatively large rotational movement of said rotary member, pivotal movement of said engine being unaccompanied by any transmission of drive between the first and second members.

2. Aircraft as claimed in claim 1 wherein said second member is an arcuate channel member which is rotatable about the axis of pivotal movement of said engine, and said first member is a lever, an end of which is part-spherical and is engaged in the said arcuate channel member, the pivotal axis of said lever being at an angle to the first-mentioned axis.

3. Aircraft as claimed in claim 2 wherein the said device includes a spindle to which said channel member is secured, and a drive shaft carrying the said rotary member and engaged with said spindle for rotation therewith, multi-start threads being provided on the said drive shaft.

4. Aircraft as claimed in claim 3 wherein a ball screw and nut mechanism connects the drive shaft and the rotary member.

* * * * *